United States Patent
Schofield et al.

(10) Patent No.: US 6,257,346 B1
(45) Date of Patent: Jul. 10, 2001

(54) STAND-UP WEEDER (75) Inventors: Robert T. Schofield, Madison; Paul A. Schneider, Waunakee, both of WI (US)

(73) Assignee: Alterra Holding Corporation, Portland, OR (US)

( * ) Notice: Subject to any disclaimer, the term of this patent is extended or adjusted under 35 U.S.C. 154(b) by 0 days.

(21) Appl. No.: 09/393,958

(22) Filed: Sep. 10, 1999

Related U.S. Application Data
(60) Provisional application No. 60/148,998, filed on Aug. 13, 1999.

(51) Int. Cl.⁷ ................................................ A01B 1/18
(52) U.S. Cl. .................................... 172/381; 294/50.8
(58) Field of Search ...................... 172/378, 371, 172/380, 381; 294/50.6, 50.7, 80.8

(56) References Cited

U.S. PATENT DOCUMENTS

| | | |
|---|---|---|
| 182,367 | 9/1876 | Jones . |
| 500,538 | 6/1893 | Dunlap . |
| 630,946 | 5/1899 | Strout . |
| 652,077 | 6/1900 | Burson . |
| 654,904 | 7/1900 | Marchant . |
| 685,872 | 11/1901 | Sanford . |
| 772,097 | 10/1904 | Hayes . |
| 774,142 | 11/1904 | Brick . |
| 840,229 | 1/1907 | Moss . |
| 902,070 | 10/1908 | Gooch . |
| 1,007,752 | 11/1911 | Thompson . |
| 1,225,188 | 5/1917 | Smith . |
| 1,328,063 | 1/1920 | St. John . |
| 1,340,624 | 5/1920 | Panetti . |
| 1,443,138 | 1/1923 | Littley . |
| 1,455,144 | 5/1923 | Moors . |
| 1,466,168 | 8/1923 | Holton . |
| 1,472,832 | 11/1923 | Hennings . |
| 1,501,965 | 7/1924 | Moors . |
| 1,553,270 | 9/1925 | Saffold . |
| 1,692,436 | 11/1928 | Deane . |
| 1,783,026 | 11/1930 | Ober . |
| 1,895,214 | 1/1933 | Stork . |
| 1,939,897 | 12/1933 | Hill . |
| 2,019,357 | 10/1935 | Oestreich . |
| 2,030,770 | 2/1936 | Smith . |
| 2,049,298 | 7/1936 | Jung . |
| 2,057,142 | 10/1936 | Fry . |
| 2,210,440 | 8/1940 | Avary . |
| 2,230,498 | 2/1941 | Loos et al. . |
| 2,264,636 | 12/1941 | Griswold et al. . |

(List continued on next page.)

FOREIGN PATENT DOCUMENTS

1291057   2/1987   (SU) .

*Primary Examiner*—Robert E. Pezzuto
(74) *Attorney, Agent, or Firm*—Foley & Lardner (57) ABSTRACT

A device for removing weeds from the ground comprises an elongated shaft, a handle mounted to an upper end of the shaft, a pair of blades mounted for opposed pivotal movement at a lower end of the shaft, and a plunger. Each blade has an upper section located above a pivot point of the blade and a lower section located below the pivot point. The plunger is mounted for reciprocal sliding movement between an extended position intermediate the lower sections of the blades and a retracted position intermediate the upper sections of the blades. The plunger and the upper sections of the blades include cam surfaces configured such that movement of the plunger from the extended position to the retracted position forces the upper sections of the blades away from one another, whereby tips of the blades are forced to converge towards one another to capture the weed and accompanying root structure. The weed and surrounding soil plug can be released by squeezing a hand-lever.

25 Claims, 5 Drawing Sheets

U.S. PATENT DOCUMENTS

| | | |
|---|---|---|
| 2,343,176 | 2/1944 | Fierbaugh . |
| 2,358,632 | 9/1944 | Gerken . |
| 2,378,459 | 6/1945 | Beardsley . |
| 2,439,524 | 4/1948 | Moore . |
| 2,531,297 | 11/1950 | Rose . |
| 2,763,222 | 9/1956 | Herstedt . |
| 2,873,809 | 2/1959 | Loomis . |
| 3,123,391 | 3/1964 | Novak . |
| 3,171,499 | 3/1965 | Edwards . |
| 3,210,112 | 10/1965 | Glynn . |
| 3,293,674 | 12/1966 | Sapia . |
| 3,332,501 | 7/1967 | Parish . |
| 3,333,881 | 8/1967 | Hollinger . |
| 3,369,834 | 2/1968 | Miles . |
| 3,444,934 | 5/1969 | Alberto . |
| 3,444,938 | 5/1969 | Ballmann . |
| 3,567,264 | 3/1971 | Baber . |
| 3,602,542 | 8/1971 | Disston, Jr. . |
| 3,608,644 | 9/1971 | Ambrose . |
| 3,680,641 | 8/1972 | Hein . |
| 3,865,055 | 2/1975 | Gilbaugh . |
| 3,927,721 | 12/1975 | Coppock . |
| 4,466,490 | 8/1984 | Eckels . |
| 4,473,248 | 9/1984 | Preradovich . |
| 4,556,114 | 12/1985 | Ryan . |
| 4,585,072 | 4/1986 | Martinez . |
| 4,791,995 | 12/1988 | Hochlan, Jr. . |
| 4,819,736 | 4/1989 | Hedgepeth . |
| 4,832,132 | 5/1989 | Barcelon . |
| 4,848,484 | 7/1989 | Clements . |
| 4,884,638 | 12/1989 | Hoffman . |
| 5,060,997 | 10/1991 | Plecki . |
| 5,154,465 | 10/1992 | Pakosh . |
| 5,188,340 | 2/1993 | Green . |
| 5,207,466 | 5/1993 | Ohlson . |
| 5,234,241 | 8/1993 | Ikerd . |
| 5,322,130 | 6/1994 | Ryden . |
| 5,360,071 | 11/1994 | Bergendorf . |
| 5,386,681 | 2/1995 | Trahan et al. . |
| 5,469,923 | 11/1995 | Visser . |
| 5,476,298 | 12/1995 | Etemadian . |
| 5,491,963 | 2/1996 | Jerez . |
| 5,535,833 | 7/1996 | Mathews . |
| 5,555,943 | 9/1996 | Blasczyk . |
| 5,730,226 | 3/1998 | Kendall . |
| 5,743,340 | 4/1998 | Giacomini . |
| 5,848,653 | 12/1998 | Warter . |
| 5,865,259 | 2/1999 | Catto . |

STAND-UP WEEDER

This application is a of Provisional Application 60/148,998, filed Aug. 13, 1999.

FIELD OF THE INVENTION

The present invention relates to a weed pulling or similar device that permits an operator to remain standing while using the device. More particularly, the invention relates to a weed pulling device in which grasping movement of blades about the weed results from the interaction of downward movement of the device coupled with relative upward movement of a uniquely shaped plunger between the blades.

BACKGROUND OF THE INVENTION

There are many types of lawn and garden tools which can be utilized to remove weeds from the ground. Most of these tools have few or no moving parts and instead rely on fixed position blades of one configuration or another (e.g., shaped like a small shovel, trowel, fork, sickle, hoe, etc.) for facilitating weed removal. Examples of such devices are shown in U.S. Pat. Nos. 5,484,653, 5,469,923, 5,386,681, 5,360,071, 5,207,466, 5,188,340 and 5,060,997. Although these types of weed removing devices can be simple and inexpensive to manufacture, substantial manual effort is often required to remove the weeds from the ground or to remove the weed plug from the device. Further, these types of devices not well suited for removing the root structures of the weeds.

Other types of weed pulling or similar devices include movable blade-like members that are lever actuated and configured to penetrate the ground and grasp the weed upon actuation by the operator. Examples of such devices are shown in U.S. Pat. Nos. 5,535,833, 5,476,298, 5,154,465, 5,476,248 and 4,473,248. Because these types of tools require the operator to squeeze a hand-actuated lever to actuate the blade-like members about the weed and soil plug, a significant amount of hand strength is typically required, particularly during operation in difficult soil conditions (e.g., heavily compacted soil or high clay content).

Other known types of weeding devices employ rotating members configured for penetrating the ground (e.g., drill bits or augers) and exterminating the weed and corresponding root structure. Examples of such devices are shown in U.S. Pat. Nos. 5,865,259, 5,491,963, 3,444,934 and 2,763,222. Tools of this type, however, can be relatively complex and costly to manufacture and may be more prone to breakage than the foregoing types.

Another example of a known weed pulling device is shown in U.S. Pat. No. 5,234,241. This patent discloses a manually operable weed remover consisting of a cluster of pivotal spikes guided by a bottom flange and pivotally attached to a handle. When the device is positioned over the center of a weed and downward pressure is applied, the flange is forced up by the ground and the spikes are forced into the ground in a converging motion around the weed. The plug is released from the device by actuation of a rod attached to a central knob or T-shaped handle. The weed remover may also be configured to store and deliver liquid or powdered weed killer. One drawback of the radial spikes and guide flange arrangement is that the narrow spikes can become bent from the repeated collapsing movement over prolonged use, particularly in rocky conditions. If even one spike becomes bent or otherwise out of radial alignment with the other spikes, the guide flange is unable to pass move vertically relative to spikes and the device becomes inoperative.

As such, there is a continuing need for new and improved manually operable garden tools which are simple to manufacture and which at the same time require less physical effort to remove weeds, and which remain operable even when used for prolonged periods in difficult soil conditions. In these and other respects, the present invention substantially fulfills this need.

SUMMARY OF THE INVENTION

In view of the disadvantages inherent in the foregoing types of weed removing tools presently known, the present invention provides an improved weeder construction that can be used to remove substantially all of the root structure associated with a weed while a user of the tool applies only minimal physical effort. The weeder is constructed in a simplified manner using materials and configurations the various components designed to provide the weeder with enhanced durability over extended use. As such, the general purpose of the present invention is to provide a new and improved weeder which has all the advantages of the foregoing known weed removing tools and none of the disadvantages.

In accordance with the foregoing, the present invention provides an apparatus for removing weeds from the ground. The apparatus comprises an elongated shaft, a handle mounted to an upper end of the shaft, a pair of blades mounted for opposed pivotal movement at a lower end of the shaft, and a plunger. Each blade has an upper section above a pivot point of the blade and a lower section below the pivot point. The plunger is mounted for reciprocal sliding movement between an extended position intermediate the lower sections of the blades and a retracted position intermediate the upper sections of the blades. The plunger and the upper sections of the blades are configured such that movement of the plunger from the extended position to the retracted position forces the upper sections of the blades away from one another and the tips of the blades towards one another.

The invention also provides a weeding device comprising a center tube, a handle mounted to an upper end of the tube, and a weed grasping assembly mounted at a lower end of the tube. The weed grasping assembly includes a housing, a pair of blades mounted in the housing for opposed pivotal movement, and a plunger mounted for sliding movement between the blades. The plunger and the blades are configured such that the blades are in an open position when the plunger is in an extended position, at which a lower face of the plunger is adjacent tips of the blades. When the plunger is moved to a retracted position, at which an upper portion of the plunger is inside the tubular shaft, the blades are forced into a collapsed position with the tips of the blades adjacent one another.

The invention further provides a weed removing apparatus comprising an elongated shaft, a handle mounted to an upper end of the shaft, at least two blades mounted for collapsing pivotal movement at a lower end of the shaft, and a plunger. Each blade includes an inwardly bent portion located above a pivot point of the blade and a pointed weed grasping portion located below the pivot point. The plunger is mounted for reciprocal sliding movement between an position intermediate the weed grasping portions of the blades and a retracted position intermediate the inwardly bent portions of the blades. The plunger is configured such that movement of the plunger from the extended position to the retracted position forces the inwardly bent portions of the blades outwardly and the weed grasping portions of the blades to collapse.

These and other benefits and features of the present invention will be apparent upon consideration of the following detailed description of preferred embodiments thereof, presented in connection with the following drawings in which like reference numerals identify like elements throughout.

DETAILED DESCRIPTION OF THE PREFERRED EMBODIMENTS

Figures 1, 6, 7:
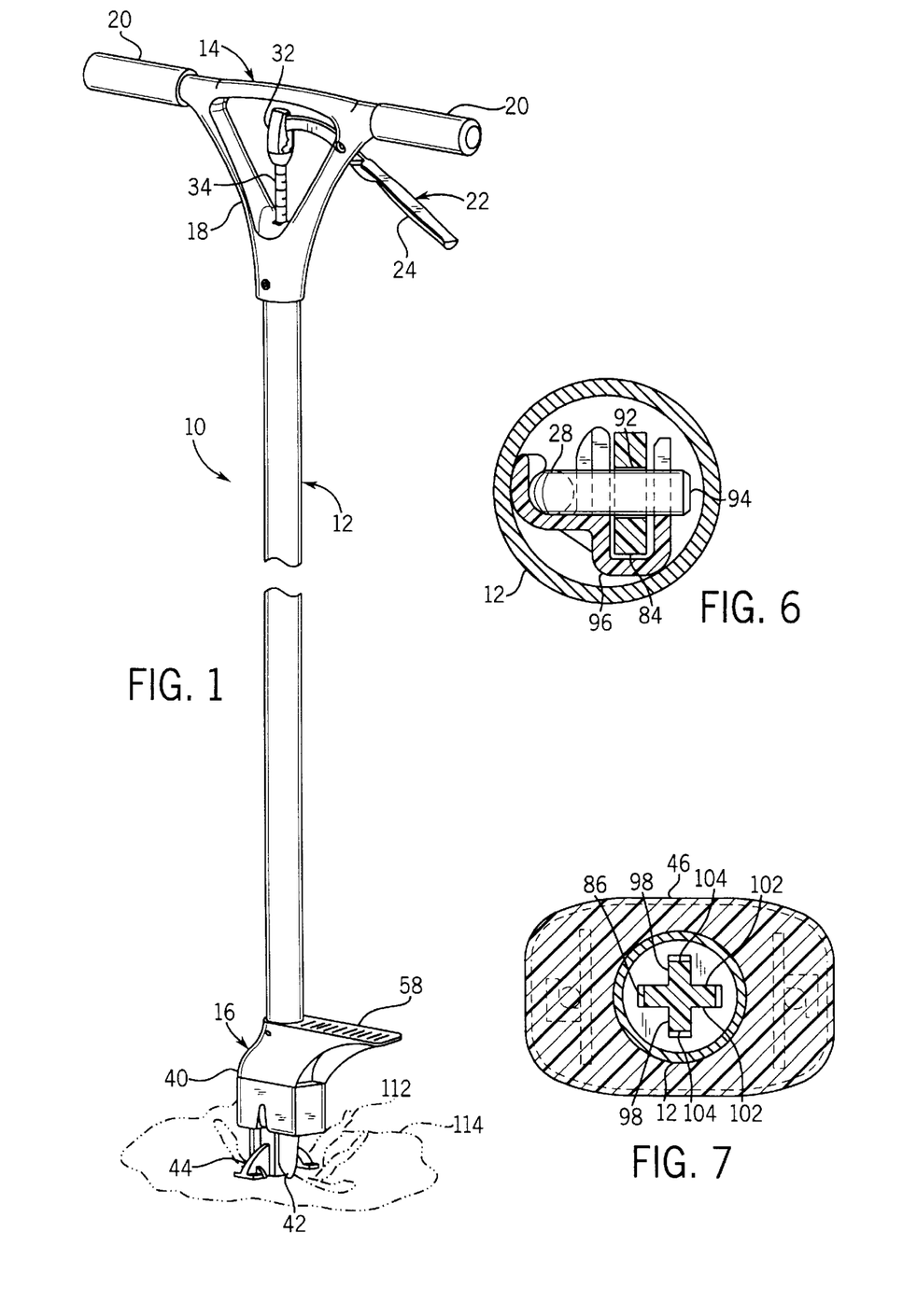
FIG. 1 is perspective view of a weeding device in accordance with a preferred embodiment of the present invention.
FIG. 6 is a horizontal-sectional view taken along the line 6—6 in FIG. 3, showing an interconnection between an actuation rod and the plunger.
FIG. 7 is a horizontal-sectional view taken along the line 7—7 in FIG. 3, showing the interlocking arrangement of the housing, tubular shaft, and plunger.

As shown in FIG. 1, a preferred embodiment of a weeder 10 includes as main components an elongated shaft 12 having a topmost mounted handle structure 14 and a bottommost mounted weed grasping assembly 16. Preferably, elongated shaft 12 is made from tubular aluminum to provide a strong and lightweight structure.

Figure 2A:
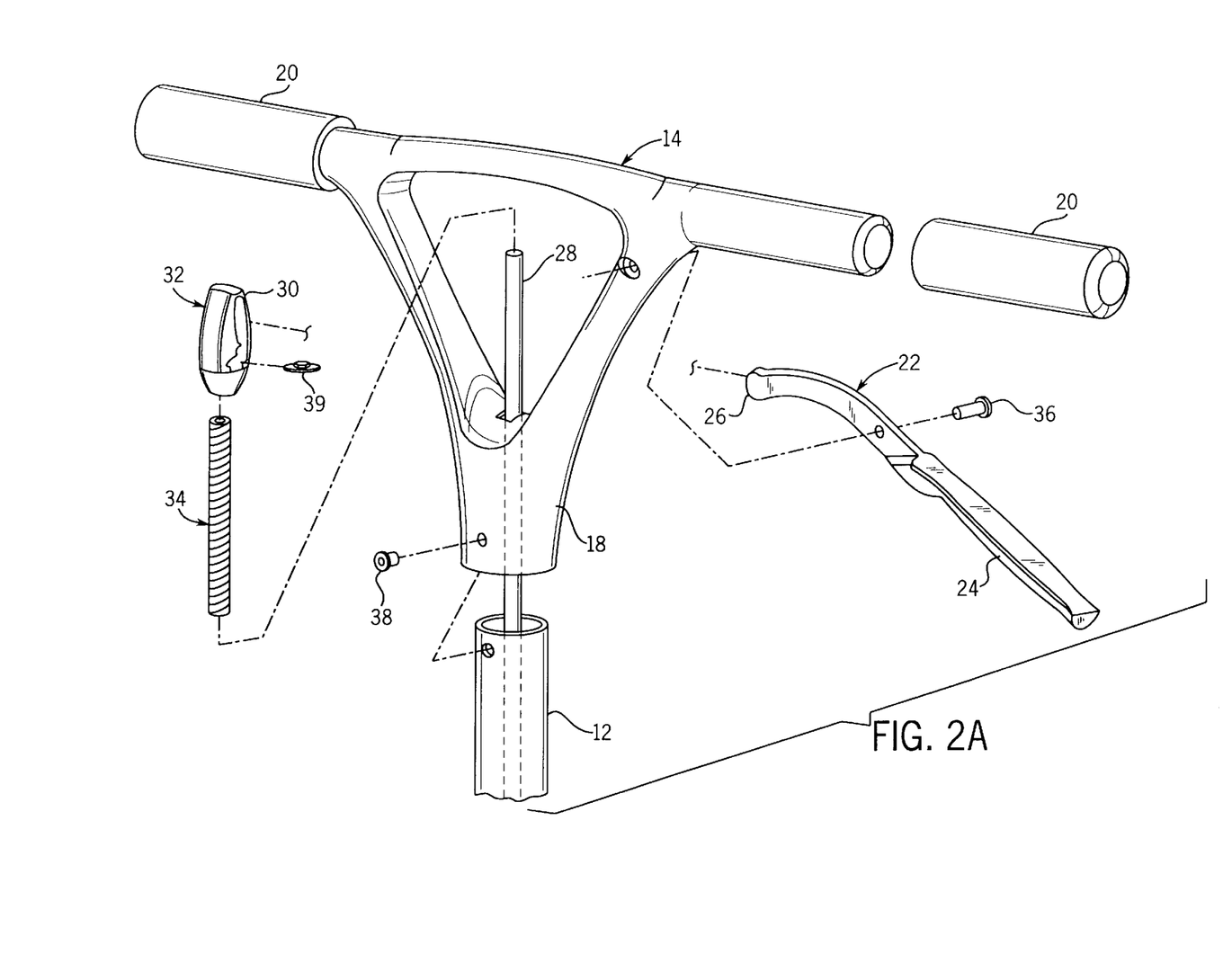
FIG. 2A is an enlarged, exploded perspective view of the handle portion of the weeding device of FIG. 1.

With reference to FIG. 2A, it can be seen that handle structure 14 is generally T-shaped and comprises a stirrup 18 and a pair of opposed hand-grips 20 mounted thereon. Stirrup 18 preferably includes a pivotally mounted hand-lever 22, the purpose of which will become clear below. Hand-lever 22 includes a finger-grip 24 located below one of the hand-grips 20 and terminates at a rounded inner end 26 configured for pivotal coupling with an upper end of an actuation rod 28. More specifically, rounded inner end 26 of hand-lever 22 is configured to fit within a slot 30 provided in a coupling 32 mounted on the upper end of actuation rod 28. A compression or return spring 34 preferably extends over actuation rod 28 and is captured between stirrup 18 and coupling 32 so that, when finger-grip 24 is not being squeezed toward hand-grip 20 by an operator, actuation rod 28 is biased upwardly to a raised position. As illustrated, stirrup 18 is fixedly secured to shaft 12 by a pop rivet 36, hand-lever 22 is pivotally secured to stirrup 18 by a semi-tubular rivet 38, and coupling 32 is fixedly secured to actuation rod 28 by a push nut 39. Preferably, stirrup 18 is made from material that comprises 20% graphite and 80% plastic, hand-grips 20 are made from polyvinyl chloride (PVC), and hand-lever 22 is made from cast aluminum. It will be recognized that other attachment means and materials could be used.

Figure 2B:
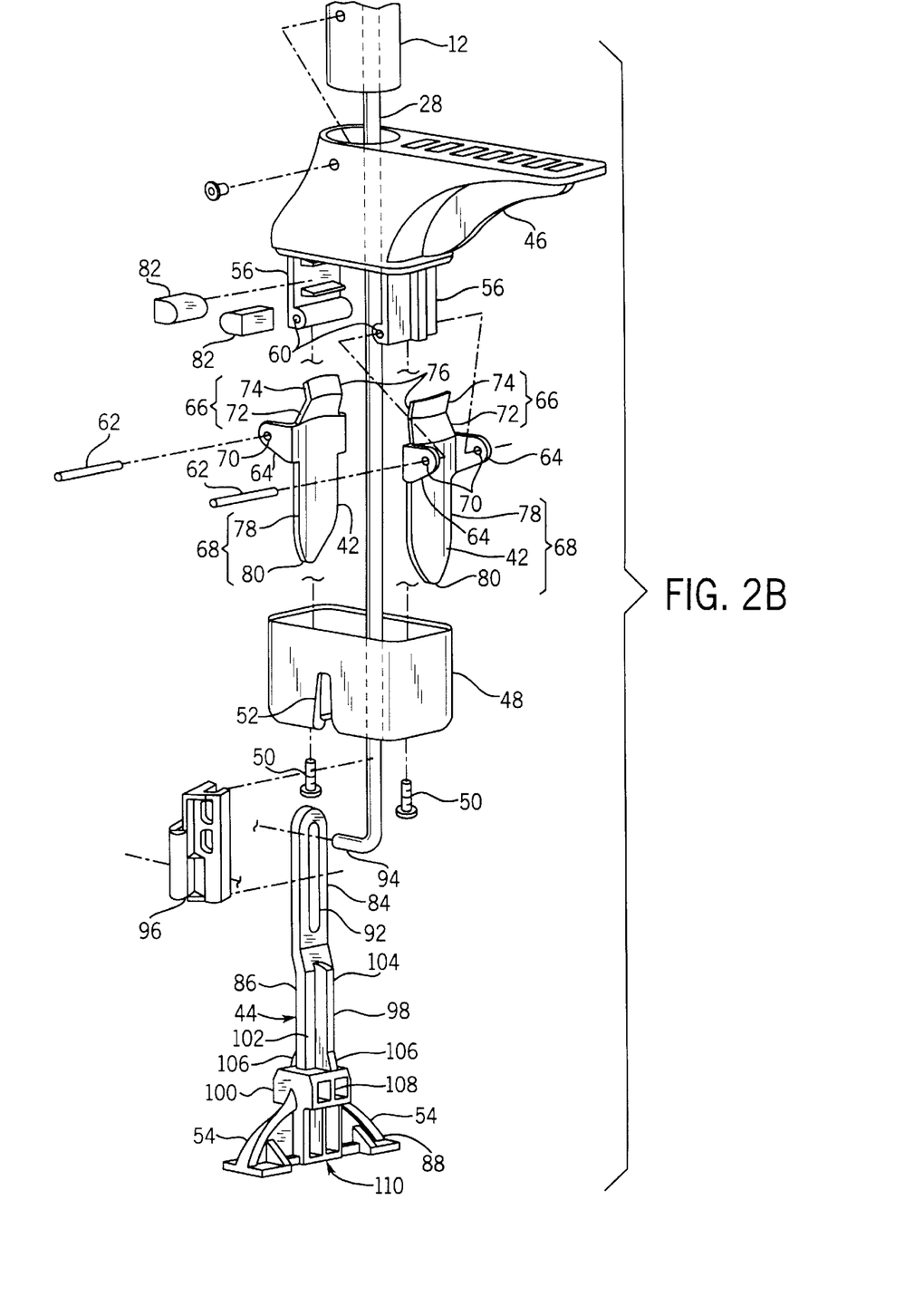
FIG. 2B is an enlarged, exploded perspective view of the weed grasping assembly of the weeding device of FIG. 1.

Referring now to FIG. 2B, weed grasping assembly 16 includes a housing 40, a pair of blades 42 mounted in housing 40 for opposed pivotal movement, and a plunger 44 mounted for reciprocal sliding movement between blades 42. Housing 40 comprises an upper housing section 46 and a lower housing section (or cap) 48 configured for attachment thereto (e.g. by screws or bolts 50). Lower housing section 48 preferably includes a pair of vertically extending slots 52 (only one of which is visible in FIG. 2B) for accommodating lateral extensions 54 on plunger 44. Upper housing section 46 is illustrated with a pair of downwardly extending arms 56 and a foot-stand 58. Each downwardly extending arm 56 includes a horizontally extending aperture 60 configured for receiving a dowel pin 62. Dowel pins 62 are used to pivotally mount blades 42 in housing 40. Housing 40 is preferably made from a nylon material.

As best seen in FIG. 2B, each blade 42 includes a pair of outwardly extending pivot arms 64 (i.e., extending horizontally away from the opposite blade 42), an upper section 66 located above pivot arms 64, and a lower section 68 located below pivot arms 64. Each pair of pivot arms 64 includes a pair of aligned apertures 70 configured for receiving one of the dowel pins 62. Upper section 66 of each blade 42 includes an upwardly and inwardly angled extending portion 72 (i.e., extending at an angle upwardly and toward the opposite blade 42) and an upwardly extending distal portion 74, which portions 72 and 74 intersect along a transition region (or cam surface) 76. Lower section 68 of each blade 42 includes a relatively wide downwardly extending main portion 78 which gradually tapers to a distal tip 80 configured for piercing the ground. For purposes described more fully below, a pair of elastomeric springs 82 (or other biasing device) is preferably mounted to upper housing section 46 intermediate the inner surfaces of downwardly extending arms 56 and the opposed outer surfaces of transition regions 76 of upper blade sections 66 (see FIGS. 3 and 4). Preferably, blades 42 are made from stainless steel, dowel pins 62 are made from hardened steel, and elastomeric springs 82 are made from a low durometer rubber material.

Referring again to FIG. 2B, plunger 44 can be seen to include a narrow upper section 84, a slightly wider middle section 86, and an enlarged bottom section 88. Upper section 84 of plunger 44 is narrow enough that it can be received within an inner surface 90 of tubular shaft 12 when plunger 44 is moved to a fully retracted position (see FIG. 4). Upper section 84 preferably includes a vertically extending slot 92 configured for receiving and slidably coupling with a bent lower end 94 of actuation rod 28. A glide plate 96 may be used to maintain lower end 94 in alignment with slot 92 (see FIG. 6). That is, glide plate 96 prevents rod 28 and its bent lower end 94 from twisting out of slot 92 or binding in slot 92 during operation. Preferably, plunger 44 is made from an acetal compound, actuation rod 28 is made from medium carbon steel, and glide plate 96 is made from a nylon material.

Middle section 86 of plunger 44 includes a pair of vertically oriented ridges 98 and a relatively wide block-shaped lower end 100. Vertically oriented ridges 98 extend outwardly from opposite side surfaces 102 of plunger 44 such that plunger 44 is plus-shaped ("+") in horizontal cross-section (see FIG. 7). Each ridge 98 includes a vertically extending and outwardly facing cam surface 104 extending along an upper portion of ridge 98, and an upwardly and outwardly facing angled cam surface 106. Angled cam surface 106 provides a smooth transition from vertical cam surface 104 to a vertically extending and outwardly facing cam surface 108 on the relatively wide block-shaped lower end 100. Outwardly facing cam surfaces 104, 106 and 108 of middle section 86 are configured to interact with and actuate blades 42 in a manner described in detail below with reference to the manner of operation of weeder 10.

Figure 3:
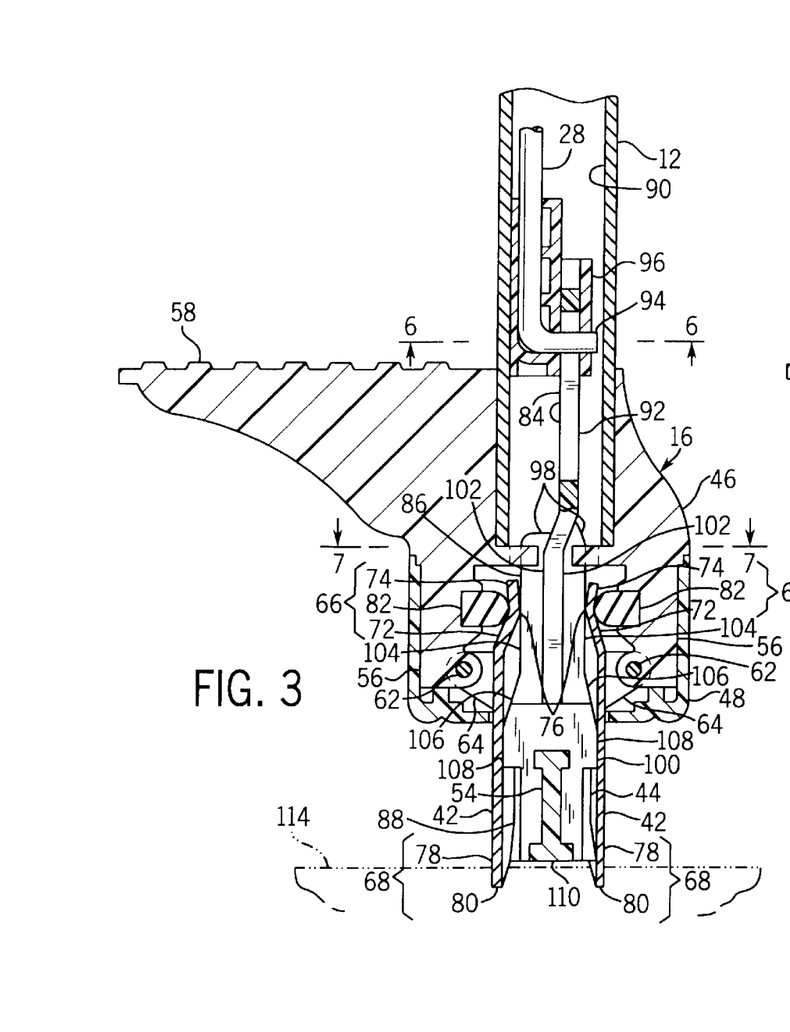
FIG. 3 is a cross-sectional view of the weed grasping assembly of the weeding device of FIG. 1, showing the blades in an open position.
Figure 4:
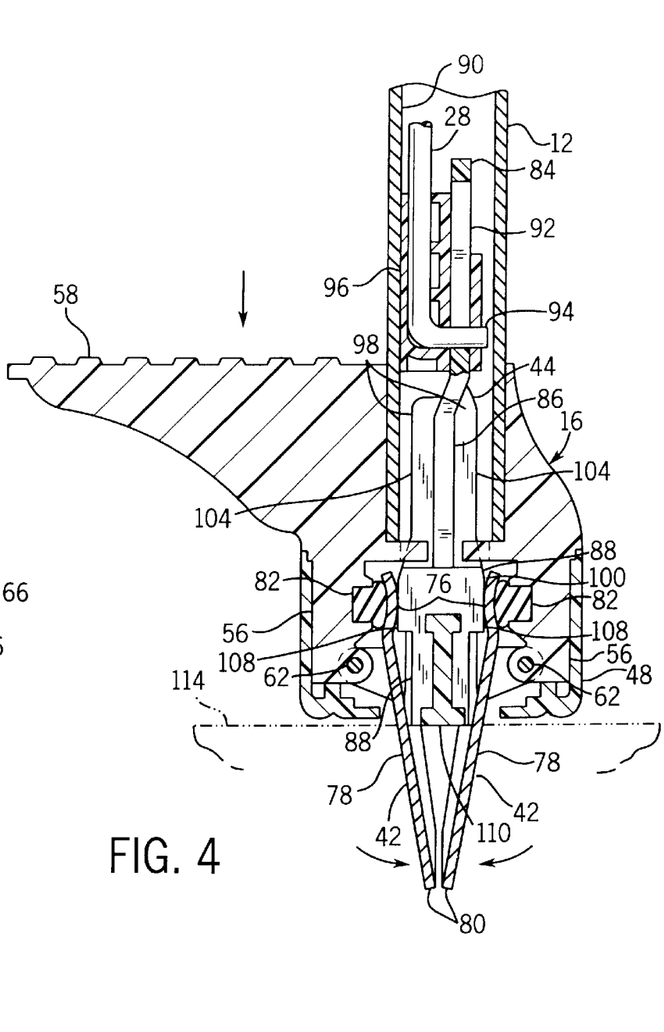
FIG. 4 is a cross-sectional view of the weed grasping assembly similar to FIG. 3, but showing the blades in a closed position.

As best seen in FIGS. 1, 3 and 4, enlarged bottom section 88 of plunger 44 includes a substantially planar bottom surface 110 configured to resist penetration into the ground. Preferably, plunger 44 includes the pair of lateral extensions 54 for increasing the ground engaging area of planar bottom surface 110 and further resisting penetration into the ground.

With the foregoing construction of weeder 10 having been fully described, the manner of operation of weeder 10 for removing a weed 112 from the ground 114 will now be explained with reference to FIGS. 1 and 3–5. Starting with FIG. 1, weeder 10 is positioned over the center of weed 112 such that blade tips 80 are on either side of side of weed 112, and downward pressure is applied by pushing on hand-grips 20 or stepping on foot-stand 58. Applying downward pressure on weeder 10 forces blades 42 into the ground 114 on opposite sides of weed 112.

As blades 42 move downwardly and penetrate deeper into the ground 114, other components of weeder 10 move downwardly therewith including handle structure 14, tubular shaft 12 and housing 40. Plunger 44, however, remains stationary on top of the ground 114 because the wide planar bottom surface 110 on plunger 44 resists penetration into the ground 114. As blades 42 move downwardly relative to plunger 44 and into the ground 114, the upper blade transition regions 76 on blades 42 move downwardly along the plunger cam surfaces 104–108. More specifically, plunger 44 at the start of relative movement is near its fully extended position shown in FIG. 3, and thus transition regions 76 ride are situated on vertical cam surfaces 104 of ridges 98. During this stage of operation elastomeric springs 82 are in their expanded condition. Once plunger 44 has moved about half way toward its fully retracted position shown in FIG. 4, the upper blade transitions regions 76 begin to ride downwardly and outwardly along angled cam surfaces 106 of ridges 98, which movement forces upper blade sections 66 away from each other and hence distal blade tips 80 towards one another. As blades 42 continue deeper into the ground, plunger 44 retracts further into shaft 12 as blade tips 80 continue to converge. Once plunger 44 is fully retracted into shaft 12 (see FIG. 4), the upper blade transition regions 76 are situated on outer cam surfaces 108 of block-shaped lower end 100 and blade tips 80 are adjacent one another. During this stage of operation, elastomeric springs 82 are in their fully compressed condition. At this point, weeder 10 may be pulled upwardly by the operator to remove the captured weed 112 and its accompanying root structure from the ground 114. It can thus be seen that the closing movement of weeder 10 results from interaction of a downward force on shaft 12 coupled with the interacting cam surfaces on blades 42 and plunger 44.

Figure 5:
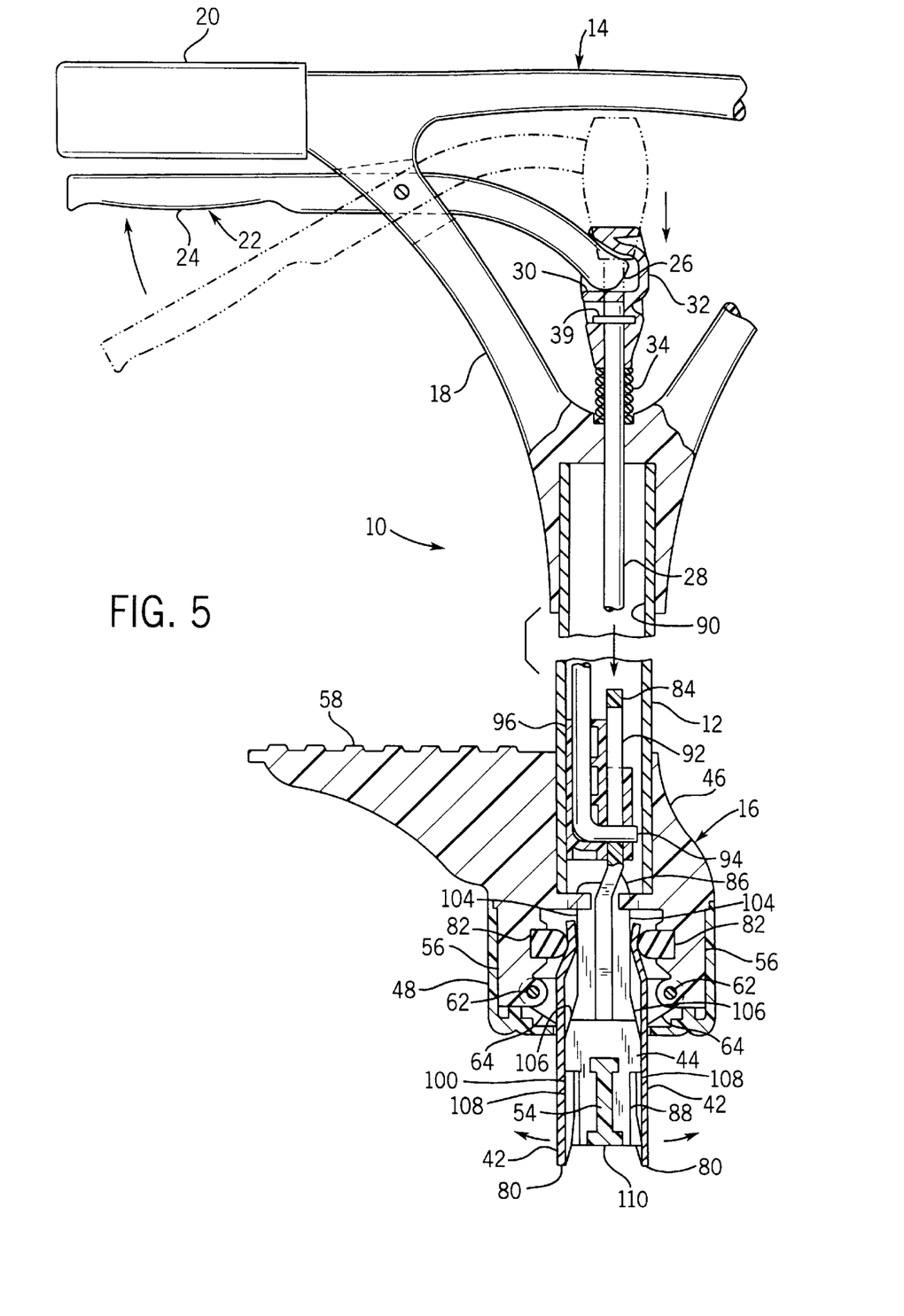
FIG. 5 is a cross-sectional view of the handle portion and weed grasping assembly of the weeding device of FIG. 1, showing a hand-lever being operated to force the plunger to an extended position to open the blades.

The opening movement of weeder 10 is accomplished by the operator simply squeezing finger-grip 24 upwardly toward hand-grip 20 as shown in FIG. 5. Squeezing finger-grip 24 upwardly causes hand-lever 22 to pivot such that actuation rod 28 is forced downwardly relative to tubular shaft 12 and slot 92 on plunger 44. At some point, bent end 94 of actuation rod 28 bottoms out in slot 92 and begins to push plunger 44 downwardly out of shaft 12 towards its fully extended position. As plunger 44 moves downwardly and thus blade transition regions 76 move upwardly (relatively speaking) toward vertical cam surfaces 104, elastomeric springs 82 expand to maintain transition regions 76 in contact with plunger cam surfaces 104–108. Thus, upper blade sections 66 pivot inwardly while distal tips 80 simultaneously move away from one another, which allows the soil plug and weed 112 to be expelled. When the operator releases finger-grip 24, compressed return spring 34 expands and thus forces actuation rod 28 back to its raised position illustrated in FIG. 1.

Numerous characteristics, advantages, and embodiments of the invention have been described in detail in the foregoing description with reference to the accompanying drawings. However, the disclosure is illustrative only and the invention is not limited to the precisely illustrated and described embodiments. For example, although the plunger is preferably configured to fit at least partially within the tubular shaft when retracted upwardly, the plunger could instead retract upwardly along the outside of the shaft or remain at all times below the shaft. In addition, although preferred materials for the various components of the weeder have been described above, other types of materials could of course be used. These and other changes and modifications may be effected by one skilled in the art without departing from the scope or spirit of the present invention, which is limited only by the scope of the claims which follow.

What is claimed is:

1. An apparatus for removing weeds from the ground, comprising:
    an elongated shaft;
    a handle mounted to an upper end of the shaft;
    a pair of blades mounted for opposed pivotal movement at a lower end of the shaft, each blade having an upper section above a pivot point of the blade and a lower section below the pivot point; and
    a plunger mounted for sliding movement between an extended position intermediate the lower sections of the blades and a retracted position intermediate the upper sections of the blades,
    wherein the plunger and the upper sections of the blades are configured such that movement of the plunger from the extended position to the retracted position forces the upper sections of the blades away from one another, whereby tips of the blades are forced toward one another.

2. The apparatus of claim 1, wherein the plunger includes cam surfaces configured for interacting with cam surfaces on the upper sections of the blades.

3. The apparatus of claim 1, wherein the plunger includes a wide bottom face configured to resist penetration into the ground.

4. The apparatus of claim 1, wherein an upper end of the plunger retracts into a hollow interior of the shaft when the plunger moves to the retracted position.

5. The apparatus of claim 1, wherein the plunger is connected to a release lever that is manually operable to force the plunger from the retracted position back to the extended position.

6. The apparatus of claim 5, wherein the release lever is a hand-lever pivotally mounted to the handle and connected to the plunger by a rod extending though a hollow interior of the shaft.

7. The apparatus of claim 1, wherein the handle is a T-shaped handle including a pair of grips.

8. The apparatus of claim 1, further including a foot-stand located adjacent the lower end of the shaft.

9. The apparatus of claim 1, wherein the shaft is long enough that an operator can remain standing while removing a weed from the ground.

10. The apparatus of claim 1, wherein the upper ends of the blades are biased toward each other by a spring.

11. The apparatus of claim 1, wherein the plunger includes a bottom surface configured to forcibly expel a soil plug and/or weed captured between the lower sections of the blades as the plunger moves from the retracted position to the extended position.

12. The apparatus of claim 3, wherein the plunger includes at least one lateral extension configured to increase the size of the wide bottom face of the plunger.

13. A weeding device comprising:
 a center tube;
 a handle mounted to an upper end of the tube; and
 a weed grasping assembly mounted at a lower end of the tube, the assembly including
 a housing,
 a pair of blades mounted in the housing for opposed pivotal movement, and
 a plunger mounted for sliding movement between the blades,
 wherein the plunger and the blades are configured such that the blades are in an open position when the plunger is in an extended position at which a lower face of the plunger is adjacent tips of the blades, and
 wherein the blades are forced into a collapsed position with the tips of the blades adjacent one another when the plunger is moved to a retracted position at which a portion of the plunger is inside a hollow interior of the tube.

14. The weeding device of claim 13, wherein the plunger is connected to a release lever that is manually operable to force the plunger from the retracted position back to the extended position.

15. The weeding device of claim 14, wherein the release lever is a hand-lever pivotally mounted to the handle and connected to the plunger via a rod extending though the center tube.

16. The weeding device of claim 13, wherein the assembly further includes a foot-stand.

17. The weeding device of claim 13, wherein the center tube is long enough that an operator can remain standing while removing a weed from the ground.

18. The weeding device of claim 13, wherein upper ends of the blades are biased toward each other by a biasing device.

19. The weeding device of claim 13, wherein at least one of the housing, the handle, and the plunger is made from a plastic, nylon or graphite material.

20. The weeding device of claim 13, wherein the plunger includes cam surfaces configured for interaction with cam surfaces on the blades.

21. The weeding device of claim 13, wherein the lower face of the plunger is a wide planar surface configured to resist penetration into the ground.

22. The weeding device of claim 13, wherein the plunger includes a bottom surface configured to forcibly expel a soil plug and/or weed captured between lower sections of the blades as the plunger moves from the collapsed position to the extended position.

23. The weeding device of claim 21, wherein the plunger includes at least one lateral extension configured to increase the size of the lower face of the plunger.

24. A weed removing apparatus comprising:
 an elongated shaft;
 a handle mounted to an upper end of the shaft;
 at least two blades mounted for opposed pivotal movement at a lower end of the shaft, each blade having an inwardly bent portion located above a pivot point of the blade and a weed grasping portion located below the pivot point; and
 a plunger mounted for sliding movement between an extended position intermediate the weed grasping portions of the blades and a retracted position intermediate the inwardly bent portions of the blades,
 wherein the plunger is configured such that movement of the plunger from the extended position to the retracted position forces the inwardly bent portions of the blades outwardly, whereby the weed grasping portions of the blades converge towards each other.

25. The apparatus of claim 24, wherein the plunger includes a bottom surface configured to forcibly expel a soil plug and/or weed captured between the weed grasping sections of the blades as the plunger moves from the retracted position to the extended position.

* * * * *